(12) United States Patent
Yuan et al.

(10) Patent No.: US 8,523,124 B2
(45) Date of Patent: Sep. 3, 2013

(54) PROTECTION FRAME FOR A PORTABLE DEVICE

(75) Inventors: Chia-Chun Yuan, New Taipei (TW); Chung-Lin Lee, New Taipei (TW); Yu-Feng Lin, New Taipei (TW); Chih-Po Hsu, New Taipei (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 9 days.

(21) Appl. No.: 13/195,027

(22) Filed: Aug. 1, 2011

(65) Prior Publication Data

US 2013/0032686 A1 Feb. 7, 2013

(51) Int. Cl.
 *F16M 13/00* (2006.01)

(52) U.S. Cl.
 USPC ............... 248/188.8; 248/351; 248/291.1; 248/357; 248/677; 361/679.3

(58) Field of Classification Search
 USPC ............... 248/351, 291.1, 292.11, 292.13, 248/292.14, 357, 188.8, 677; 361/679.01, 361/679.3
 See application file for complete search history.

(56) References Cited

U.S. PATENT DOCUMENTS

| | | | | |
|---|---|---|---|---|
| 6,097,592 | A * | 8/2000 | Seo et al. | 361/679.55 |
| 6,880,796 | B2 * | 4/2005 | Khor et al. | 248/677 |
| 7,364,126 | B2 * | 4/2008 | Tsai et al. | 248/188.8 |
| 7,594,638 | B2 * | 9/2009 | Chan et al. | 248/677 |
| 7,681,859 | B2 * | 3/2010 | Kim | 248/688 |
| 8,243,432 | B2 * | 8/2012 | Duan et al. | 361/679.3 |
| 2010/0059649 | A1 * | 3/2010 | Buxton | 248/371 |
| 2012/0154995 | A1 * | 6/2012 | Qiao et al. | 361/679.01 |
| 2012/0182678 | A1 * | 7/2012 | Wu et al. | 361/679.01 |

* cited by examiner

*Primary Examiner* — Anita M King
(74) *Attorney, Agent, or Firm* — Alan Kamrath; Kamrath IP Lawfirm, P.A.

(57) ABSTRACT

A protection frame has a frame body and a supporting arm. The frame body is mounted around the portable device. The supporting arm is mounted pivotally on the frame body to allow the user to adjust the propping angle of the portable device. Therefore, the portable device can be used at different visual angles as desired.

12 Claims, 10 Drawing Sheets

PROTECTION FRAME FOR A PORTABLE DEVICE

BACKGROUND OF THE INVENTION

1. Field of the Invention

The present invention relates to a protection frame and, especially to a protection frame for a portable device to be mounted around the portable device for protection.

2. Description of the Prior Arts

With the progress of technology, people receive information more frequently so that people also depend on portable devices more. Besides their original functions, portable devices are required to provide more diversified functions. For example, mobile phones are originally used for communication. Now mobile phones are required to have other functions such as surfing the internet, photographing, reading electronic books, watching movies and the like. For users, the traditional way to hand hold mobile phones is not enough to make proper use of all functions. Therefore, how users utilize various functions conveniently becomes one of the key points for research and design.

To overcome the shortcomings, the present invention provides a protection frame to mitigate or obviate the aforementioned problems.

SUMMARY OF THE INVENTION

The main objective of the present invention is to provide a protection frame that can prop the portable device at different angles. The protection frame has a frame body and a supporting arm. The frame body is mounted around the portable device. The supporting arm is mounted pivotally on the frame body to allow the user to adjust the propping angle of the portable device. Therefore, the portable device can be used at different visual angles as desired.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
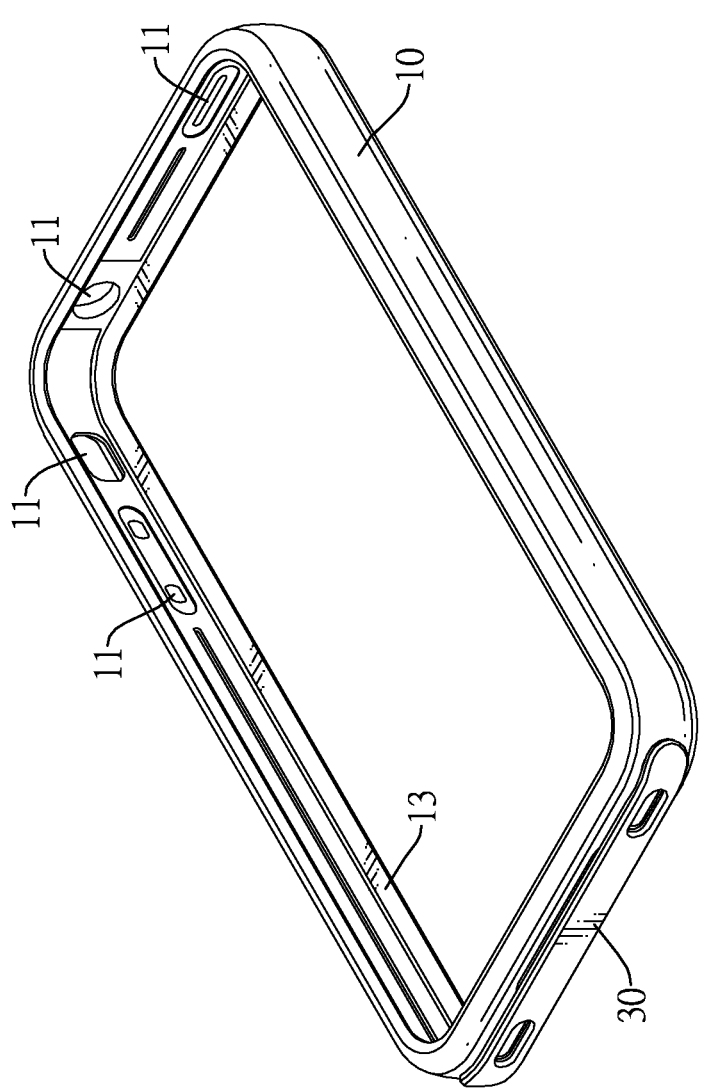
FIG. 1 is a perspective view of a protection frame in accordance with the present invention.
Figure 2:
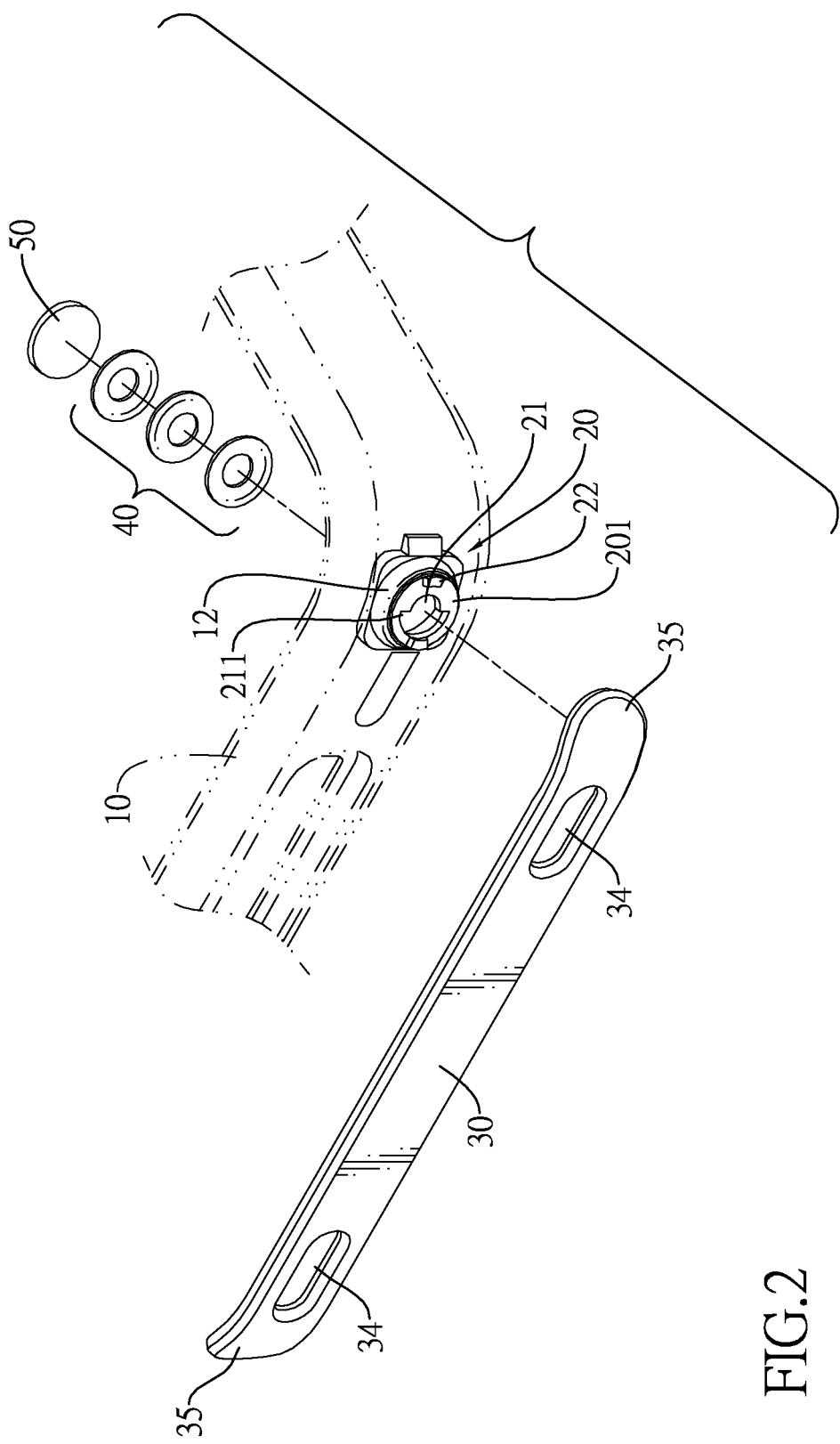
FIG. 2 is an enlarged exploded perspective view of the protection frame in FIG. 1.

With reference to FIGS. 1 and 2, a protection frame in accordance with the present invention comprises a frame body 10, a connecting bracket 20, a supporting arm 30, a resilient assembly 40 and a protecting washer 50.

The frame body 10 is mounted around a portable device for protection and may be designed in different shapes as desired with soft materials or hard materials. In a preferred embodiment, the frame body 10 is a closed square body and has multiple functioning holes 11, a connecting hole 12 and two hooking flanges 13. The functioning holes 11 are formed through the frame body 10 and respectively align with the keys or sockets of the portable device so that the keys and sockets are revealed when the frame body 10 is mounted around the portable device. The connecting hole 12 is formed through the frame body 10. The hooking flanges 13 are formed respectively on front and rear edges of an inside wall of the frame body 10 to keep the portable devices from departing from the frame body 10.

Figure 3:
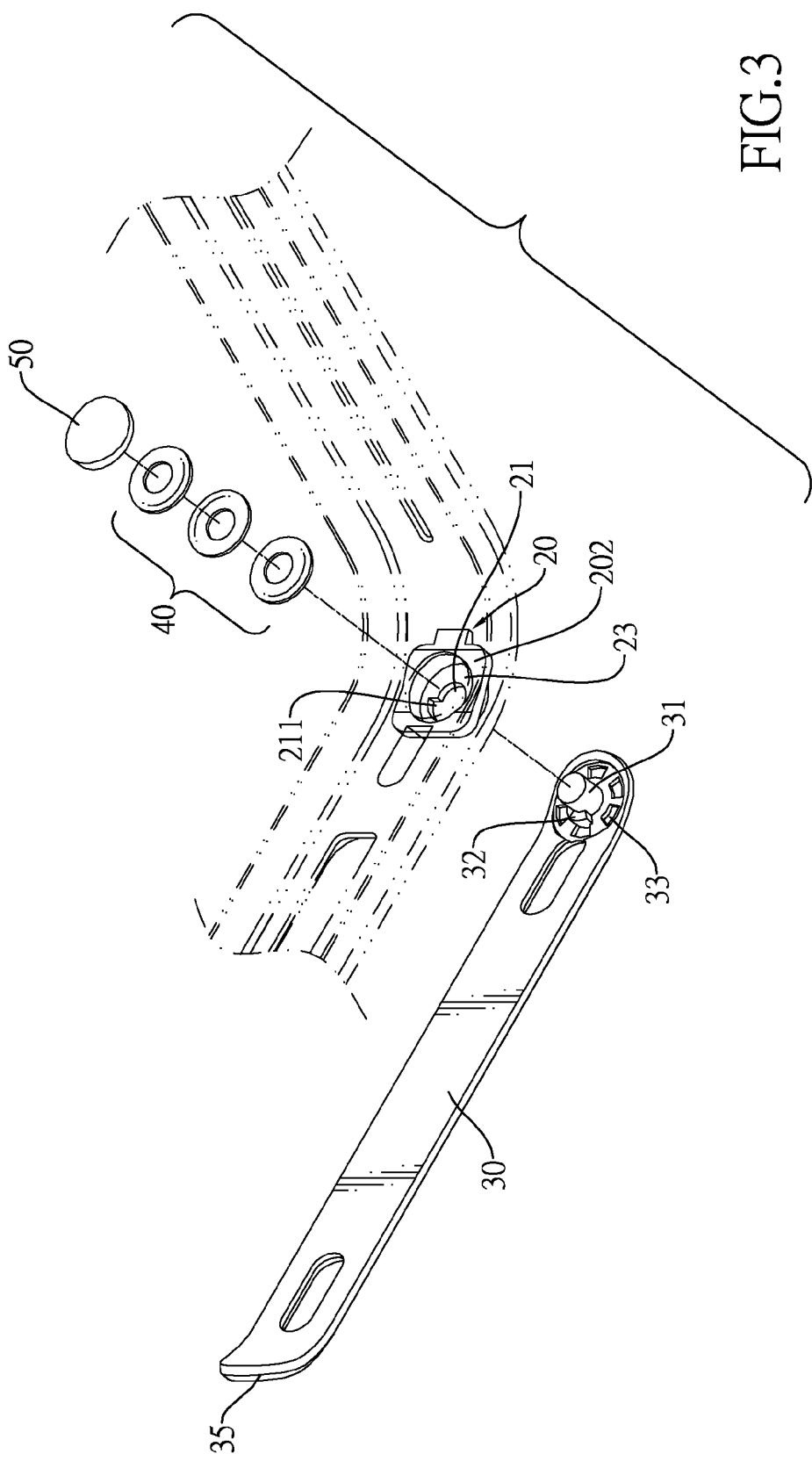
FIG. 3 is another enlarged exploded perspective view of the protection frame in FIG. 1.

With reference to FIGS. 2 and 3, the connecting bracket 20 is mounted securely through the frame body 10. In a preferred embodiment, the connecting bracket 20 is mounted through the connecting hole 12 of the frame body 10 and has a pivoting hole 21, a limiting channel 211, at least one positioning protrusion 22 and a receiving recess 23. The pivoting hole 21 is formed through the connecting bracket 20. The limiting channel 211 is formed transversely on an inside wall of the connecting bracket 20 and communicates with the pivoting hole 21. An outer side 201 of the connecting bracket 20 corresponds to an outer side of the frame body 10. An inner side 202 of the connecting bracket 20 corresponds to an inner side of the frame body 10. The at least one positioning protrusion 22 is formed on the outer side 201 of the connecting bracket 20. In a preferred embodiment, the connecting bracket 20 has two positioning protrusions 22 arranged oppositely at 180 degrees. The receiving recess 23 is formed on the inner side 202.

The supporting arm 30 is mounted pivotally on the outer side of the frame body 10 and is connected pivotally to the connecting bracket 20. The supporting arm 30 has a pivoting branch 31, a limiting protrusion 32, at least one positioning detent 33, multiple functioning holes 34 and two bending parts 35.

The pivoting branch 31 is formed on a side of the supporting arm 30 and is mounted through the pivoting hole 21 of the connecting bracket 20.

Figure 4:
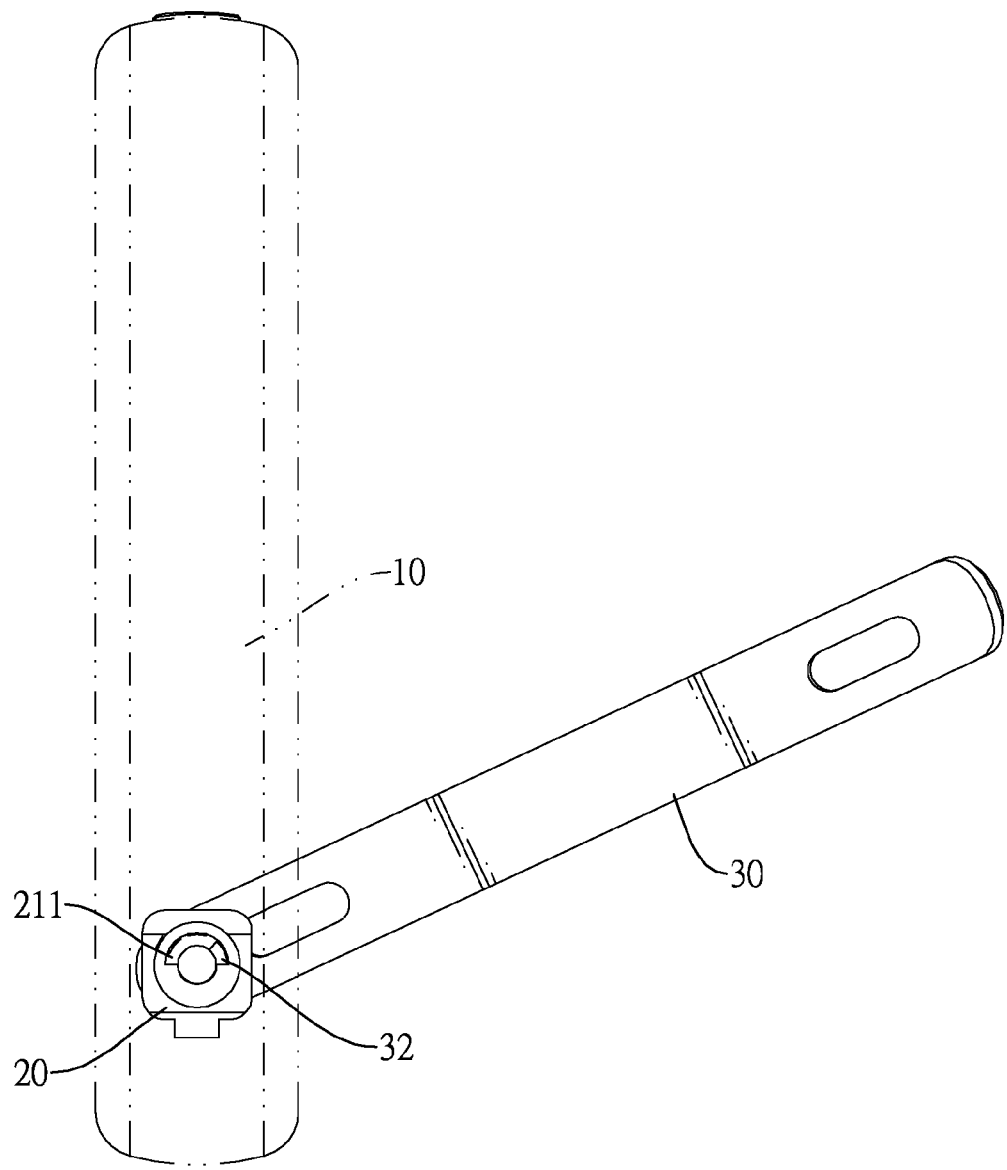
FIG. 4 is an operational side view of the protection frame in FIG. 1, shown positioned at one angle.
Figure 5:
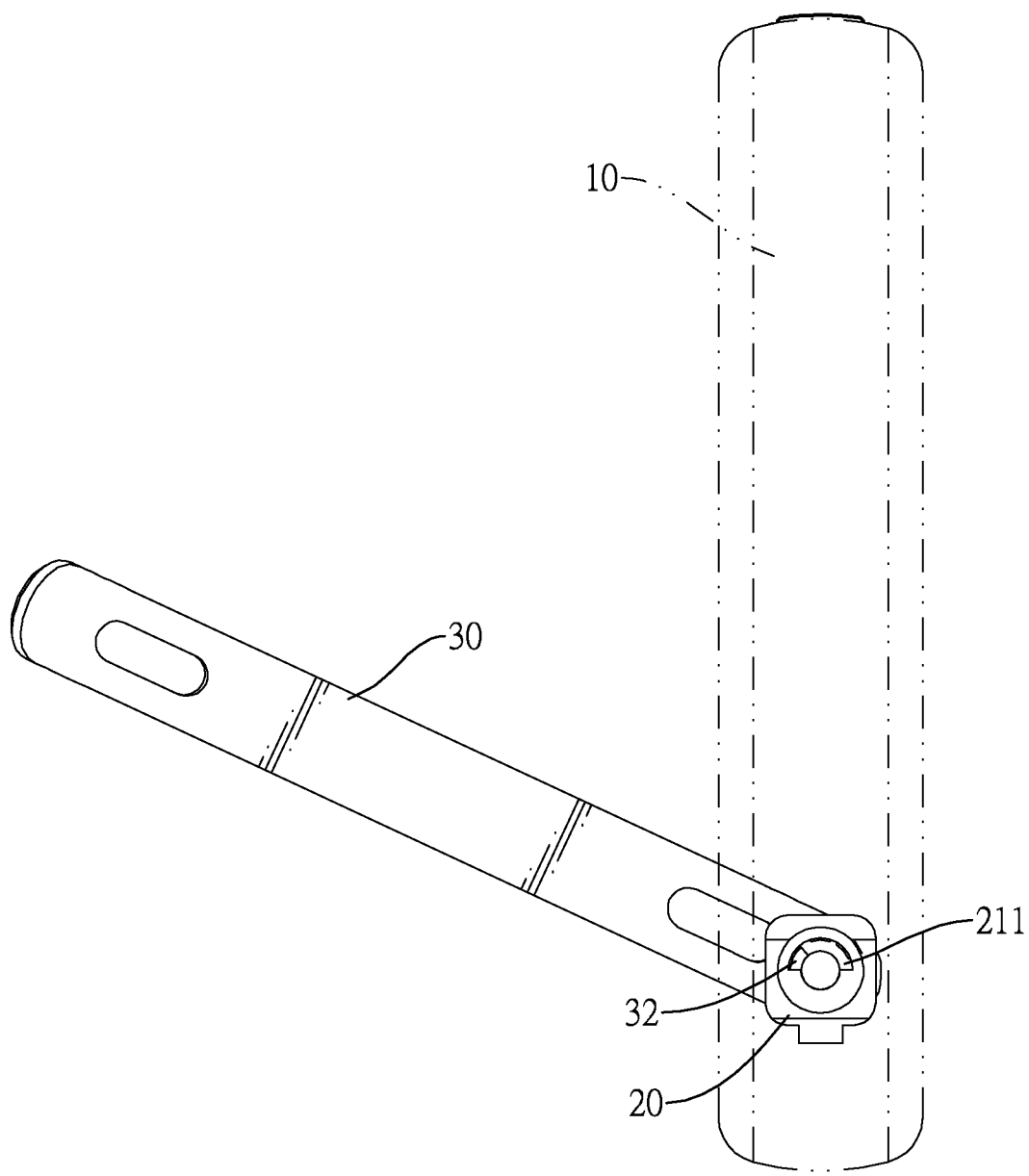
FIG. 5 is an operational side view of the protection frame in FIG. 1, shown positioned at another angle.

With reference to FIGS. 3 to 5, the limiting protrusion 32 is formed transversely on the pivoting branch 31 and is mounted slidably in the limiting channel 211 of the connecting bracket 20. When the supporting arm 30 is pivoted relative to the connecting bracket 20, the limiting protrusion 32 selectively abuts two ends of the limiting channel 211 to limit the rotating angle of the supporting arm 30.

Figure 6:
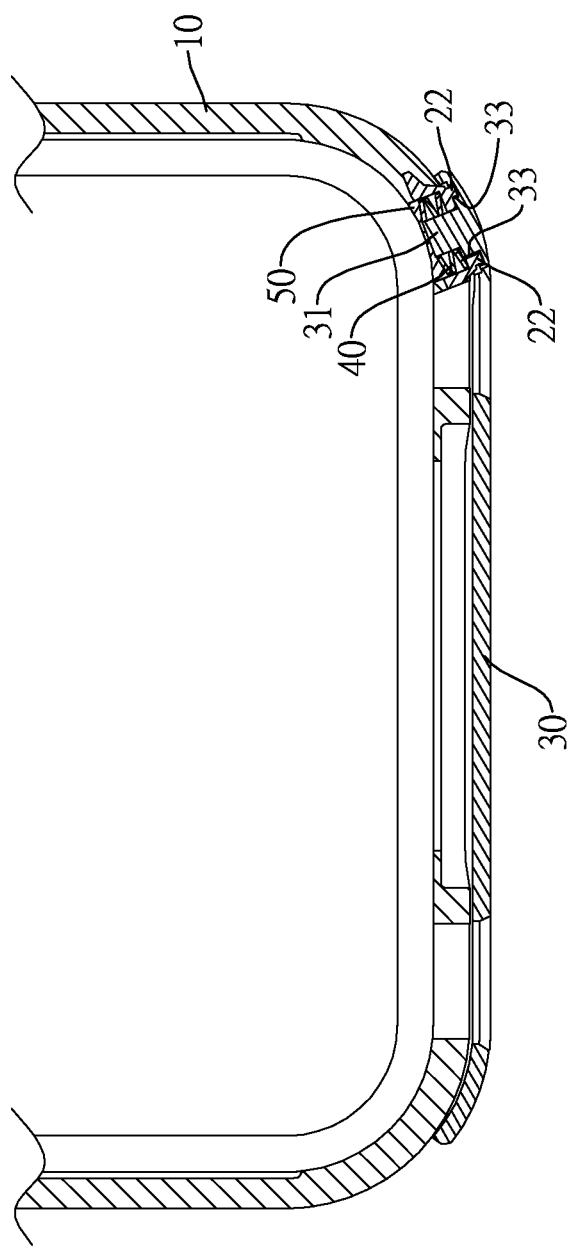
FIG. 6 is a cross-sectional front view of the protection frame in FIG. 1.

With reference to FIGS. 2, 3 and 6, the at least one positioning detent 33 is formed on the side of the supporting arm 30 and is arranged beside the pivoting branch 31. In a preferred embodiment, the supporting arm 30 has six positioning detents 33 arranged around the pivoting branch 31 at intervals of 60 degrees. The at least one positioning detent 33 selectively engages the at least one positioning protrusion 22 of the connecting bracket 20 to position the supporting arm 30 at predetermined angles.

The functioning holes 34 are formed through the supporting arm 30 and respectively align with the functioning holes 11 of the frame body 10.

With reference to FIGS. 2 and 3, the resilient assembly 40 is mounted around the pivoting branch 31 and is mounted in the receiving recess 23 of the connecting bracket 20 to provide a buffering space for axial movement when the positioning protrusion 22 of the connecting bracket 20 disengages from the positioning detent 33.

With reference to FIGS. 2 and 3, the resilient assembly 40 is mounted around the pivoting branch 31 and is mounted in the receiving recess 23 of the connecting bracket 20 to provide buffering space for axial movement when the positioning protrusion 22 of the connecting bracket 20 disengages from the positioning detent 33.

The protecting washer 50 is mounted between the inner side of the frame body 10 and the pivoting branch 31 to keep the portable device from rubbing against the pivoting branch 31 when the supporting arm 30 is pivoted. The protecting washer 50 may be made of soft materials or hard materials. In a preferred embodiment, the protecting washer 50 is mounted in the receiving recess 23, abuts against an end of the pivoting branch 31 and is adjacent to the inner side of the frame body 10.

Figure 7:
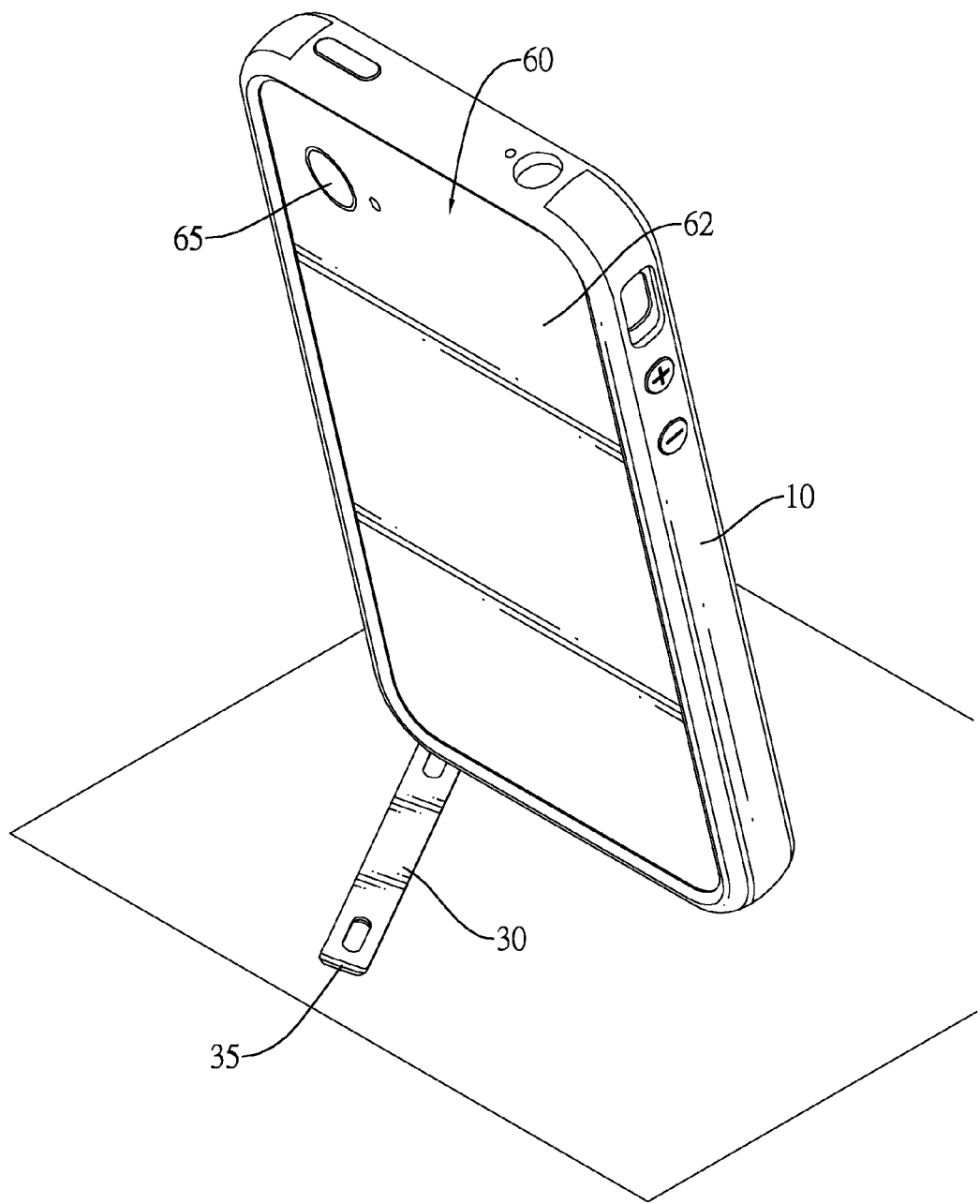
FIG. 7 is an operational perspective view of the protection frame in FIG. 1 with a portable device, shown placed uprightly with the front side facing upward.
Figure 10:
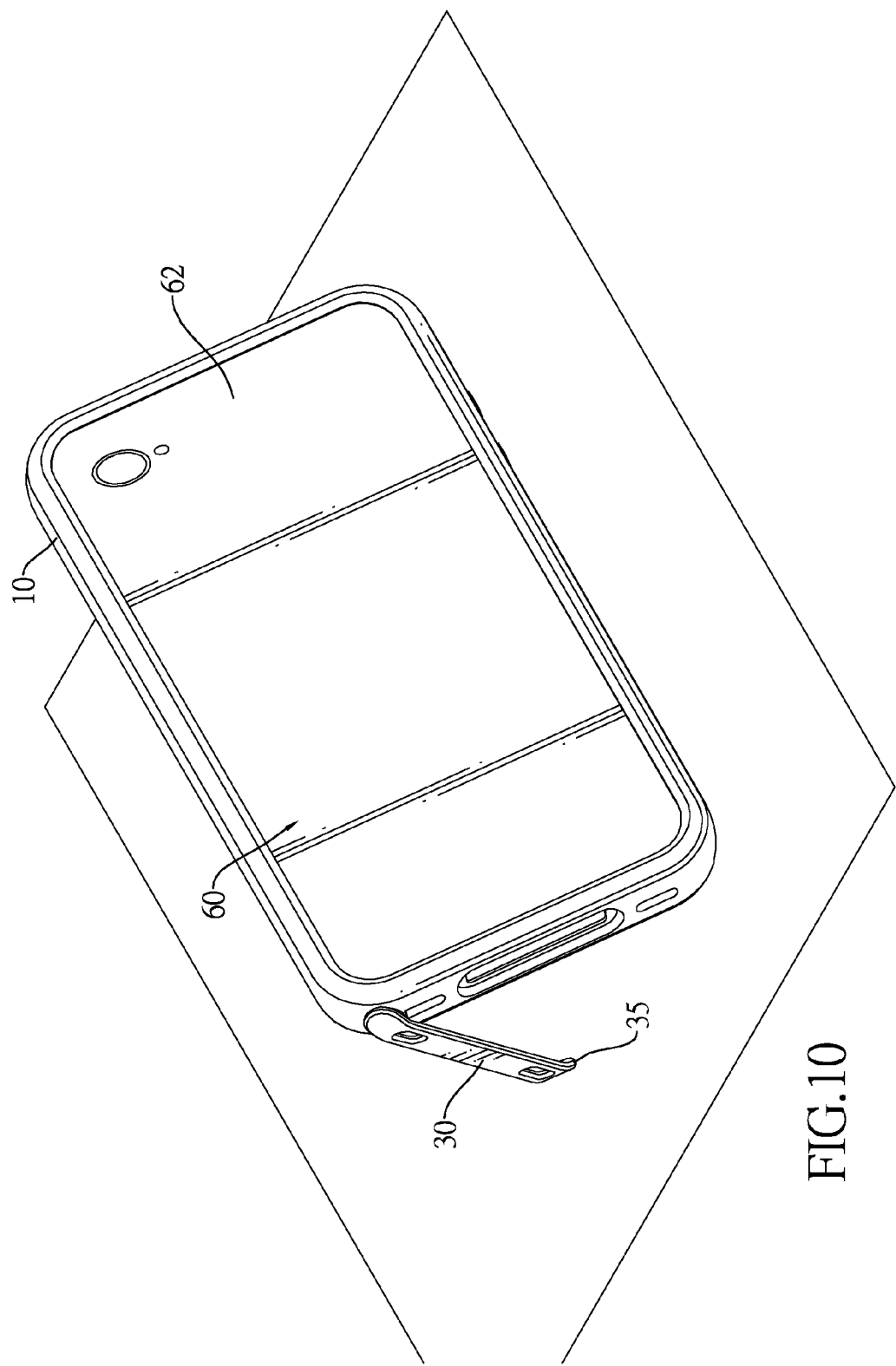
FIG. 10 is an operational perspective view of the protection frame in FIG. 1 with a portable device, shown placed laterally with the rear side facing upward.

With reference to FIGS. 1, 7 and 10, when the protection frame as described is connected to the portable device 60, the frame body 10 is mounted around the portable device 60 for protection. The hooking flanges 13 respectively abut against the front side 61 and the rear side 62 of the portable device 60 to keep the portable device 60 from departing from the frame body 10. When the portable device 60 needs to be propped, the supporting arm 30 is pivoted to be positioned at a desired angle. By the supporting arm 30 and the edges of the frame body 10 contacting the table, the portable device 60 is propped for use. In a preferred embodiment, the bending parts 35 of the supporting arm 30 abut against the table to provide better support. The portable device 60 is easily propped uprightly or laterally and the front side 61 or rear side 62 selectively faces upward. Therefore, the user can adjust the visual angle of the portable device 60 depending on different functions.

Figure 8:
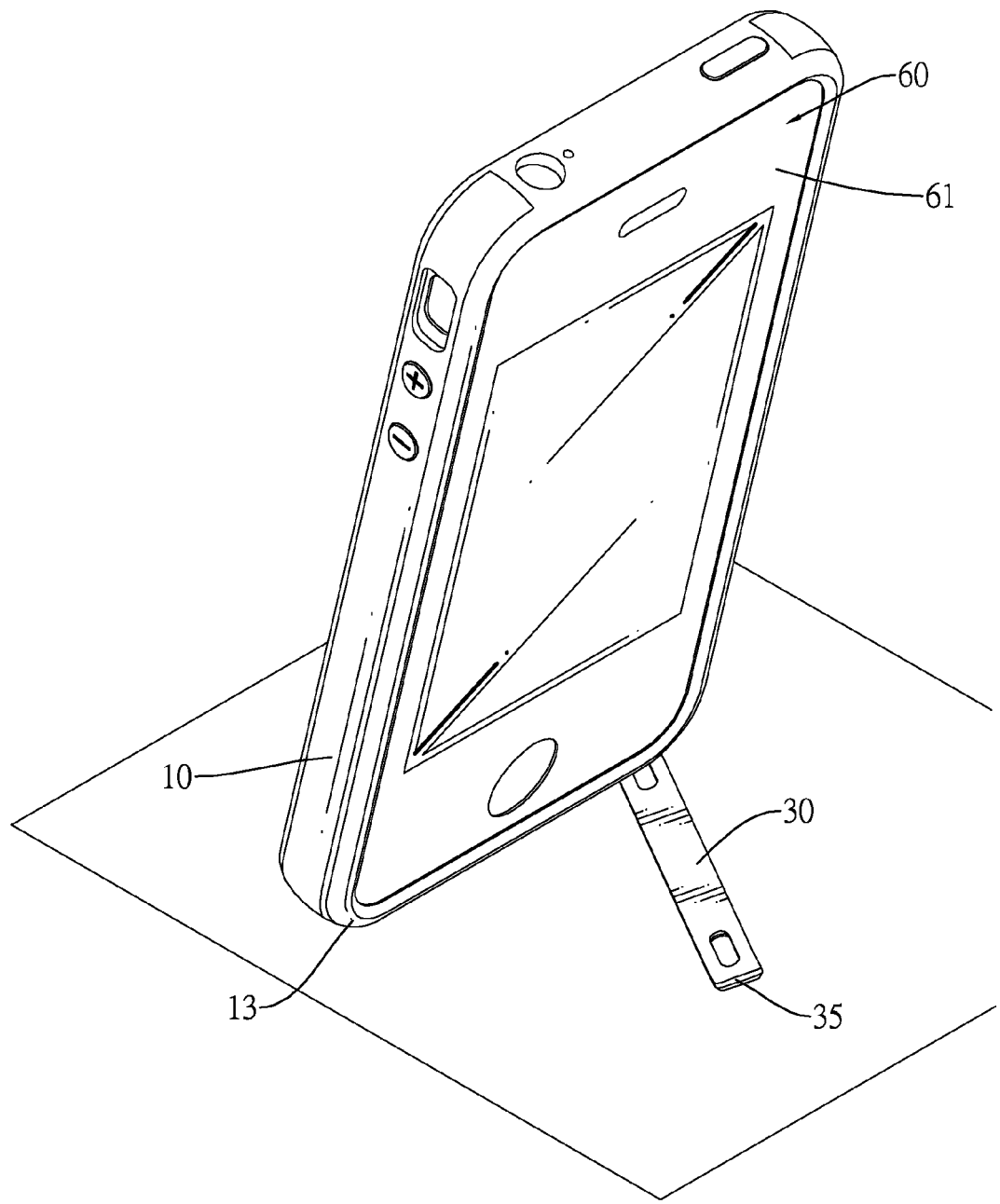
FIG. 8 is an operational perspective view of the protection frame in FIG. 1 with a portable device, shown placed uprightly with the rear side facing upward.
Figure 9:
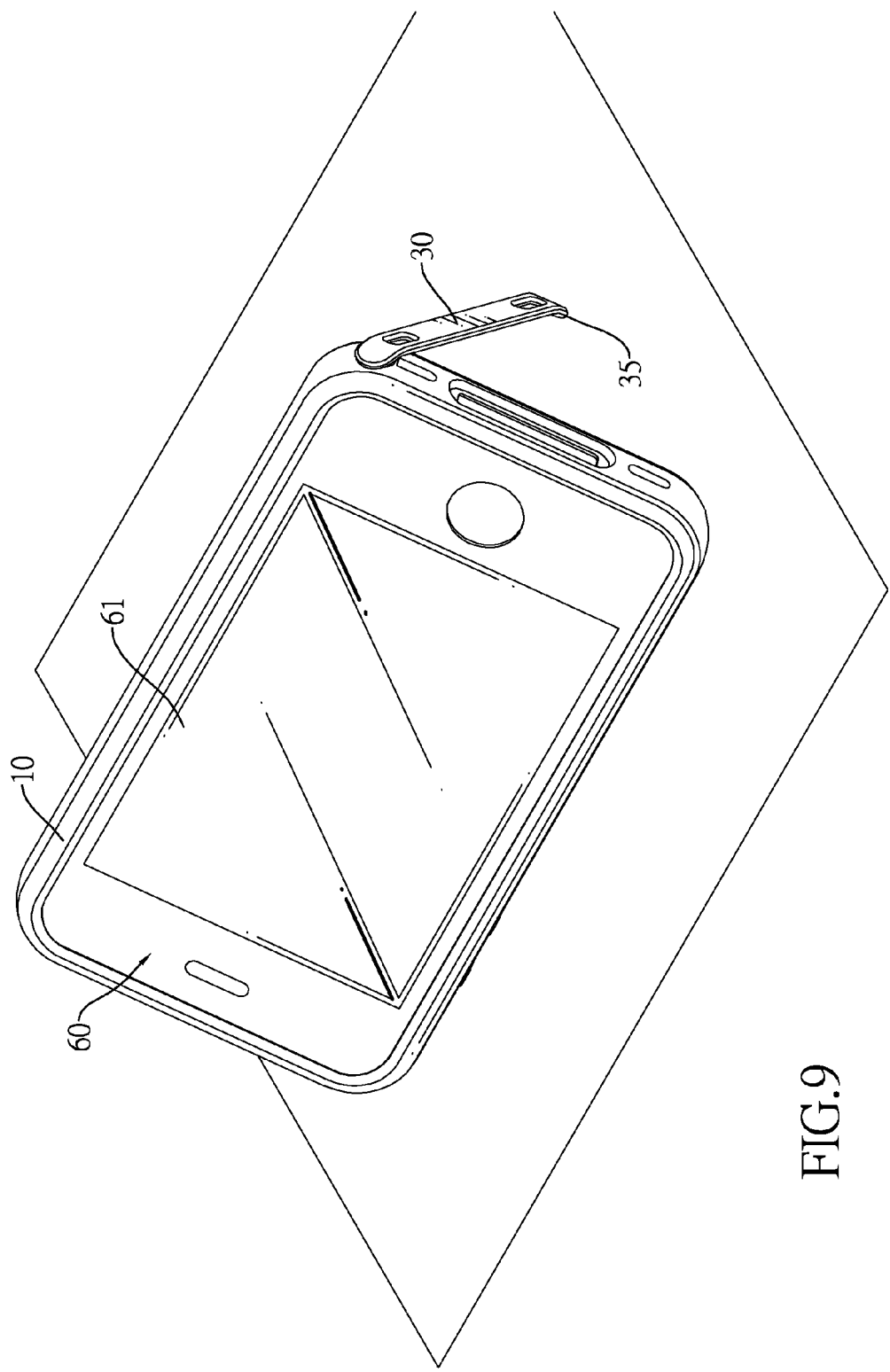
FIG. 9 is an operational perspective view of the protection frame in FIG. 1 with a portable device, shown placed laterally with the front side facing upward.

For example, when the portable device 60 is propped uprightly with the front side 61 facing upward as shown in FIG. 7, the lens 65 on the rear side 62 shoots downward, and the screen on the front side 61 outputs a vertical image. When the portable device 60 is propped uprightly with the rear side 62 facing upward as shown in FIG. 8, the lens 65 on the rear side 62 shoots upward. When the portable device 60 is propped laterally as shown in FIGS. 9 and 10, the screen on the front side 61 outputs a horizontal image, and the shooting angle of the lens 65 is changed. Additionally, the positioning detent 33 of the supporting arm 30 selectively engaging the positioning protrusion 22 of the connecting bracket 20 also helps adjust the shooting angle of the lens 65 and the visual angle of the screen.

When the portable device 60 does not need to be propped up, the supporting arm 30 is pivoted to be flush with the edge of the frame body 10 to decrease the volume so that the portable device 60 is easily stowed, carried and used with certain functions.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A protection frame comprising:
   a frame body;
   a connecting bracket mounted securely through the frame body;
   a supporting arm mounted pivotally on an outer side of the frame body and connected pivotally to the connecting bracket, wherein the connecting bracket has a pivoting hole formed through the connecting bracket, wherein the supporting arm has a pivoting branch formed on a side of the supporting arm and mounted through the pivoting hole of the connecting bracket; and
   a resilient assembly, wherein:
   the connecting bracket has
   at least one positioning protrusion formed on an outer side of the connecting bracket; and
   a receiving recess formed on an inner side of the connecting bracket;
   the supporting arm has at least one positioning detent formed on the side of the supporting arm, arranged beside the pivoting branch and selectively engaging the at least one positioning protrusion of the connecting bracket; and
   the resilient assembly is mounted around the pivoting branch of the supporting arm and is mounted in the receiving recess of the connecting bracket.

2. The protection frame as claimed in claim 1, wherein:
   the frame body has a connecting hole; and
   the connecting bracket is mounted through the connecting hole of the frame body.

3. The protection frame as claimed in claim 1 further comprising a protecting washer mounted in the receiving recess of the connecting bracket, abutting against an end of the pivoting branch of the supporting arm and mounted adjacent to an inner side of the frame body.

4. The protection frame as claimed in claim 3, wherein:
   the connecting bracket has a limiting channel formed transversely on an inside wall of the connecting bracket and communicating with the pivoting hole; and
   the supporting arm has a limiting protrusion formed transversely on the pivoting branch, mounted slidably in the limiting channel of the connecting bracket and selectively abutting two ends of the limiting channel.

5. The protection frame as claimed in claim 4, wherein:
   the frame body has a connecting hole; and
   the connecting bracket is mounted through the connecting hole of the frame body.

6. The protection frame as claimed in claim 5, wherein:
   the frame body has multiple functioning holes formed through the frame body; and
   the supporting arm has multiple functioning holes formed through the supporting arm and aligning with the functioning holes of the frame body.

7. The protection frame as claimed in claim 6, wherein the frame body has two hooking flanges formed respectively on front and rear edges of an inside wall of the frame body.

8. The protection frame as claimed in claim 5, wherein the supporting arm has two bending parts formed on two ends of the supporting arm.

9. The protection frame as claimed in claim 8, wherein:
   the frame body has multiple functioning holes formed through the frame body; and
   the supporting arm has multiple functioning holes formed through the supporting arm and aligning with the functioning holes of the frame body.

10. The protection frame as claimed in claim 9, wherein the frame body has two hooking flanges formed respectively on front and rear edges of an inside wall of the frame body.

11. A protection frame for a portable device comprising:
- a frame body;
- a connecting bracket mounted securely through the frame body; and
- a supporting arm mounted pivotally on an outer side of the frame body and connected pivotally to the connecting bracket, wherein:
- the connecting bracket has a pivoting hole formed through the connecting bracket;
- the supporting arm has a pivoting branch formed on a side of the supporting arm and mounted through the pivoting hole of the connecting bracket;
- the connecting bracket has a limiting channel formed transversely on an inside wall of the connecting bracket and communicating with the pivoting hole; and
- the supporting arm has a limiting protrusion formed transversely on the pivoting branch, mounted slidably in the limiting channel of the connecting bracket and selectively abutting two ends of the limiting channel.

12. The protection frame as claimed in claim 11 further comprising a protecting washer mounted between an inner side of the frame body and the pivoting branch of the supporting arm.

* * * * *